Jan. 3, 1950     L. TSCHUS     2,493,428
FISHING REEL.
Filed March 4, 1947
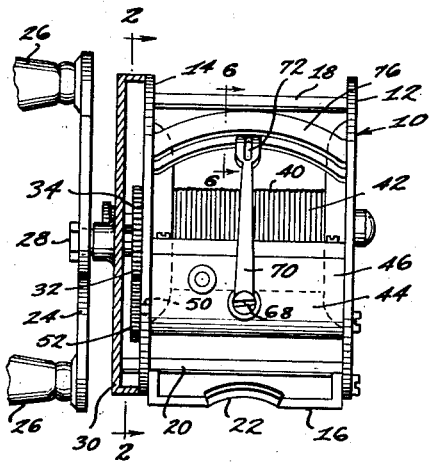
Fig. 1
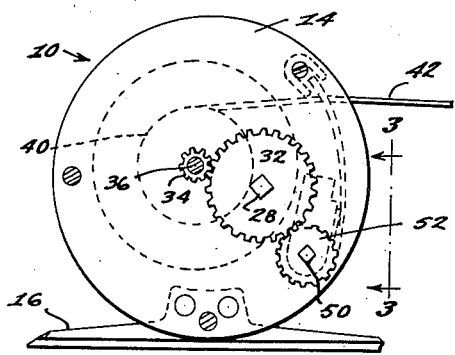
Fig. 2
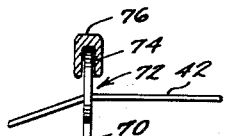
Fig. 6
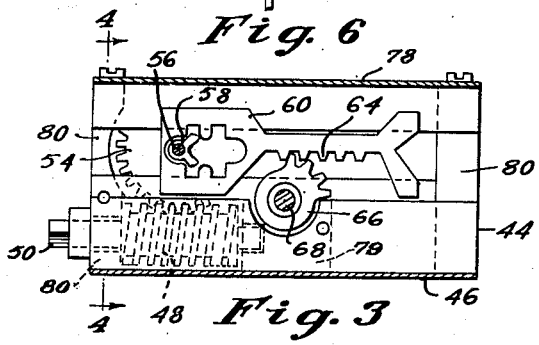
Fig. 3
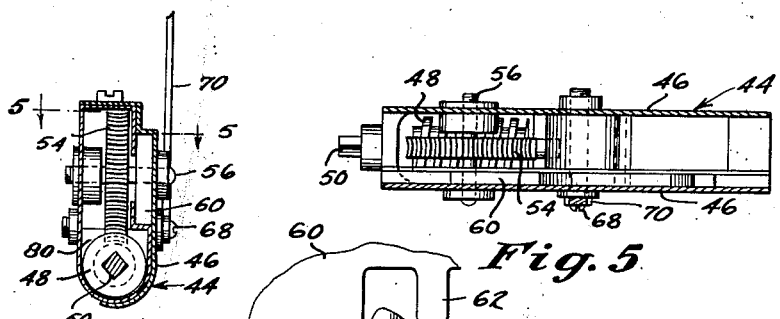
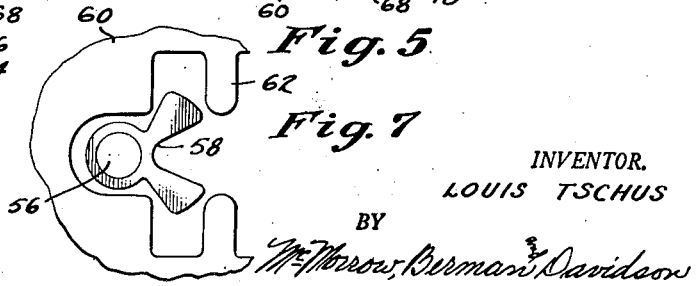
Fig. 4     Fig. 5     Fig. 7
INVENTOR.
LOUIS TSCHUS
BY
Morrow, Berman & Davidson
ATTORNEYS Patented Jan. 3, 1950

2,493,428

UNITED STATES PATENT OFFICE 2,493,428

FISHING REEL

Louis Tschus, Columbus, Ohio

Application March 4, 1947, Serial No. 732,181

3 Claims. (Cl. 242—84.4)

This invention relates to improvements in fishing reels.

An object of the invention is to provide a fishing reel which is so constructed and arranged as to wind the fishing line in level layers.

Another object of the invention is to provide a fishing reel the level wind mechanism of which is totally enclosed, thus keeping out dirt and dust, and avoiding undue wear of the parts or damage thereto.

A further object of the invention is to provide a fishing reel with level wind mechanism, which is simple in design, inexpensive to manufacture, and which is efficient and automatic in operation.

Other objects and advantages of the invention will become apparent from the following description of a preferred embodiment thereof as illustrated in the accompanying drawings, and in which, Figure 1 is an elevational view of my improved fishing reel.

Figure 2 is a sectional elevation taken on line 2—2 of Figure 1.

Figure 3 is an enlarged sectional elevational view of the level wind mechanism of the reel shown in the preceding views, such as might be seen when looking in the direction 3—3 of Figure 2, the outer wall of the mechanism being removed to show the underlying parts.

Figure 4 is a sectional elevation taken on line 4—4 of Figure 3.

Figure 5 is a sectional plan view taken on line 5—5 of Figure 4.

Figure 6 is a fragmentary sectional elevation of the fishing line distributing arm and guide groove, as seen on line 6—6 of Figure 1, and Figure 7 is an enlarged fragmentary detail of a portion of Figure 3.

In order to understand clearly the nature of the invention and the best means for carrying it out, reference may now be had to the drawings, in which like numerals denote similar parts throughout the several views.

As shown, there is a fishing reel generally indicated at 10, and including a pair of spaced upstanding end walls 12 and 14 interconnected by a bottom wall member 16 and spacer bars 18 and 20. The bottom wall member 16 is elongated as shown best in Figure 2, and has an arched central portion 22 as best shown in Figure 1, for engaging against the curved fishing reel upon which it is to be mounted by means of suitable clamps, not shown.

The reel is provided with a crank 24 having two handles 26 for rotating it about its axis to turn the shaft 28 which is journaled in the walls 14 and 30 and has keyed thereon a gear wheel 32. The gear wheel meshes with and drives a gear wheel 34 to rotate a shaft 36 also journaled between the walls, 14, 30 and 12. A drum 40 is keyed upon the shaft 36 between the two walls 12 and 14, being rotatable therewith as the gear 34 rotates, the fishing line 42 being wound on the drum and unwound therefrom during the fishing operation.

The line 42 should be wound upon the drum 40 in a number of level layers, and for this purpose a level winding mechanism is provided, it being mounted in a level winding housing 44, also mounted between the walls 12 and 14. The housing 44 has an outer wall 46 of sheet metal or other suitable material, curved to present a smooth external contour, and to cover the interior working parts thereof to block entry of dirt and dust. A worm gear 48 is keyed upon a shaft 50 which is journaled in bearing blocks 79 and 80 between the walls 12 and 14 of the reel, a gear 52 which is mounted and keyed upon the shaft 50 intermeshing with the gear 32 so as to drive the worm 48.

A gear wheel 54 is mounted and keyed upon a shaft 56 journaled between the walls 46 of the level winding housing 44, as best seen in Figures 3, 4 and 5, and intermeshes with the worm gear 48 so as to be driven thereby. A fragmentary gear member 58 having only two projecting teeth as shown best in Figures 3 and 7, is keyed upon the shaft 56 between the toothed walls of a rack member 60 so as to engage with its teeth 62 as the shaft 56 rotates, thus causing the rack member to traverse from left to right as seen in Figure 3, and back again, in a reciprocating manner.

The rack member 60 also has a number of rack teeth 64 which are adapted to engage with the teeth on a gear wheel 66 mounted and keyed on a shaft 68 also journaled in the walls 46 of the housing 44. A fishing line distributing arm 70 has its lower end, as seen in Figures 1 and 4, keyed upon the shaft 68 which thus forms the axis about which the arm 70 rotates back and forth in a reciprocating manner with the shaft 68, under the influence of the rack member 60.

The upper end of the arm 70 has an aperture 72 formed therein through which the fishing line 42 extends as best seen in Figures 1 and 6, and the upper end of the arm above the aperture 72 extends into an arcuate guide groove 74 formed in an arcuate guide member 76 mounted between the reel walls 12 and 14. The upper end of the arm 70 thus describes an arc as it is traversed back and forth across the reel drum 40, being supported by the guide member, and thus causes the fishing line 42 to be distributed in even layers upon the drum as it is rewound by means of the handles 26.

The housing 44 is totally enclosed as shown, by the walls 46, and by top member 78 and end block walls 80, so as to prevent entry of dirt and dust, and salt water which might tend to corrode the moving parts.

Although I have described a preferred embodiment of my invention in specific terms, it is to be understood that various changes may be made in size, shape, materials and arrangement without departing from the spirit and scope of the invention as claimed.

I claim:

1. A fishing reel comprising a housing, a drum rotatable in said housing for receiving the fishing line, handle-operated crank means including gears engaging said drum for rotating the same, a worm journaled in said housing and being rotatable by said crank means with said drum, a second gear engaging said worm so as to be rotatable thereby, a toothed sector wheel rotatable with said second gear, a rack member having a slot formed therein with first teeth formed along the sides of said slot for engaging with said toothed sector wheel whereby the rack is reciprocated in said housing as the sector wheel rotates, a row of second teeth on said rack member, a second toothed sector wheel engaging said second teeth and keyed upon a shaft journaled in said housing, a fishing line distributing guide arm keyed at one end upon the shaft bearing said second toothed sector wheel and turnable about its axis in a reciprocal manner, said guide arm having an aperture formed in its outer end to receive the fishing line extending therethrough as it passes onto the drum, the outer end of the guide arm thus traversing the length of the drum in a reciprocal manner, whereby the line is laid upon the drum in level layers.

2. A level winding fishing reel of the kind described comprising a housing, a line winding drum rotatable in said housing, means for rotating said drum, a worm journaled in said housing rotatable by said drum winding means, a gear engaging said worm to be rotated thereby, a segment gear connected to said gear to be rotatable with said gear, a rack member engageable with said segment gear for reciprocating transversely of said housing and said winding drum, a second segment gear engaging said rack for rocking upon reciprocation of said rack, a fish line distributing guide arm connected to said second segment gear and rockable across said drum upon rocking of said latter segment arm, and line guiding means on said guide arm for winding the line level upon said drum upon said rocking of said guide arm.

3. A level winding fishing reel of the kind described comprising a housing, a line winding drum rotatable in said housing, means for rotating said drum, a worm journaled in said housing and rotated by said drum winding means, a gear engaging said worm to be rotated thereby, a segment gear connected to said gear to be rotatable with said gear, a rack member including opposed teeth engageable with said segment gear for reciprocating transversely of said housing and said winding drum, a second segment gear engageable with a second set of teeth on said rack for rocking upon reciprocation of said rack, a fish line distributing guide arm connected to said second segment gear and rockable across said drum upon rocking of said latter segment gear, and line guiding means on said guide arm for winding the line level upon said drum upon rocking of said guide arm.

LOUIS TSCHUS.

REFERENCES CITED

The following references are of record in the file of this patent:

UNITED STATES PATENTS

| Number | Name | Date |
|---|---|---|
| 1,484,906 | Russell | Feb. 26, 1924 |
| 2,331,919 | Maynes | Oct. 19, 1943 |